United States Patent [19]

Mahr

[11] Patent Number: 4,687,124

[45] Date of Patent: Aug. 18, 1987

[54] COVER FOR A MOTOR VEHICLE SPARE WHEEL

[75] Inventor: Josef Mahr, Cologne, Fed. Rep. of Germany

[73] Assignee: Ford Motor Company, Dearborn, Mich.

[21] Appl. No.: 809,661

[22] Filed: Dec. 16, 1985

[51] Int. Cl.$^4$ ............................................. B62D 43/00
[52] U.S. Cl. ............................... 224/42.24; 224/42.26; 296/37.2
[58] Field of Search ............... 224/42.12, 42.13, 42.14, 224/42.15, 42.19, 42.2, 42.24, 42.25, 42.26, 42.27, 311; 296/37.2

[56] References Cited

U.S. PATENT DOCUMENTS

| | | | |
|---|---|---|---|
| 1,453,214 | 4/1923 | Veglio | 224/42.24 |
| 1,505,527 | 5/1924 | Belden et al. | 224/42.24 |
| 1,883,032 | 10/1932 | Smith | 224/42.24 |
| 2,049,457 | 8/1936 | Lyon | 224/42.24 |
| 2,102,469 | 12/1937 | Lyon | 224/42.24 |
| 2,108,145 | 2/1938 | Short | 224/42.24 |
| 2,147,049 | 2/1939 | Lyon | 224/42.24 |
| 2,631,886 | 3/1953 | Keller | 224/42.24 |
| 2,635,795 | 4/1953 | White | 224/42.24 |

FOREIGN PATENT DOCUMENTS 3131205 3/1982 Fed. Rep. of Germany .

Primary Examiner—Henry J. Recla
Assistant Examiner—David Voorhees
Attorney, Agent, or Firm—Jerome R. Drouillard; Roger L. May

[57] ABSTRACT

A cover for a motor vehicle spare wheel comprises a cover plate having disposed on it a fastening device by which it can be secured to the center hub of the rim of the spare wheel. Fastening device comprises a holding part which is inserted into the cover plate and which comprises an upper bearing flange and multiple spreading arms extending into the center hub bore. The holding part further comprises a locking part which is inserted through the upper bearing flange and which comprises an upper disc flange with a manually grippable handle and a spreading cam connected with the upper disc flange by a web.

5 Claims, 6 Drawing Figures

COVER FOR A MOTOR VEHICLE SPARE WHEEL

BACKGROUND OF THE INVENTION

1. Field of the Invention

This invention relates to a cover for a motor vehicle spare wheel having a center hub bore.

2. Disclosure Information

A cover for a motor vehicle spare wheel with a center hub bore is disclosed in German Offenlegungsschrift No. 31 31 205 in which a cover plate is retained to a wheel by means of an anchoring device having several resilient fingers which engage the wheel bore. The usefulness of this device is limited because the resilient fingers are able to assure adequate holding action for only one size of spare wheel central bore. In the case of vehicles produced in mass production it is customary for one specific vehicle model to be supplied with different sets of wheels depending upon the customer's specification and these wheels may be equipped with hub bores having different dimensions particularly with respect to their diameter, depth and placement.

U.S. Pat. No. 2,108,145 discloses a spring retainer means for mounting a spare wheel cover which utilizes a manually lockable push-pull operating mechanism. This mechanism is not suitable for use with wheels having various diameters and hub lengths because retention of the cover is provided by means of spring retainers biased by a fixed length actuator. The length of the actuator is not adjustable and the engagement diameter of the retainer is similarly not adjustable.

U.S. Pat. Nos. 2,102,469 and 2,049,457 disclose a spare tire cover retained by a plurality of latches pivotally mounted on studs connected to the rear flange of a rotatable lock cylinder. As with previously described systems, the system of the U.S. Pat. Nos. 2,102,469 and 2,049,457 is not suitable for use with wheels having hub bores of varying diameter and depth because the latches are not adjustable.

U.S. Pat. Nos. 1,505,527; 2,147,049; and 2,631,886, all disclose covers for spare wheels in which the cover is retained by a bolted fastener manually threadable through the center of the wheel hub. These devices are inconvenient to use inasmuch as threaded fasteners are notoriously difficult to operate without the aid of tools such as wrenches, pliers, and the like.

It is an object of the present invention to provide a cover for a motor vehicle spare wheel which is capable of fastening the cover plate securely and reliably even on spare wheels of different sizes and without the aid of any tools.

It is a further object of the present invention to provide a cover for a motor vehicle spare wheel which is suitable for use with spare wheels having varying diameter hub bores and depths of hub bore.

SUMMARY OF THE DISCLOSURE

A cover for a motor vehicle spare wheel with a center hub bore comprises a circular cover plate with a central aperture and a fastening device inserted through the central aperture for securing the cover plate to the wheel, with the fastening device comprising a bearing flange in contact with the cover plate, a plurality of spreading arms extending from the bearing flange into the center hub bore and a manually rotatable cam assembly for biasing the spreading arms into contact with the center hub bore. That portion of each of the spreading arms which contacts the center hub bore is provided with a projecting, curved, concave clamping surface. The manually rotatable cam assembly comprises a manually grippable handle rotatably mounted to the bearing flange, a spreading cam, and a web connecting the handle with the spreading cam. The spreading cam is provided with guide slots for engaging guide pins projecting from inwardly extending brackets attached to each of the spreading arms.

DETAILED DESCRIPTION OF THE PREFERRED EMBODIMENT

Figure 1:
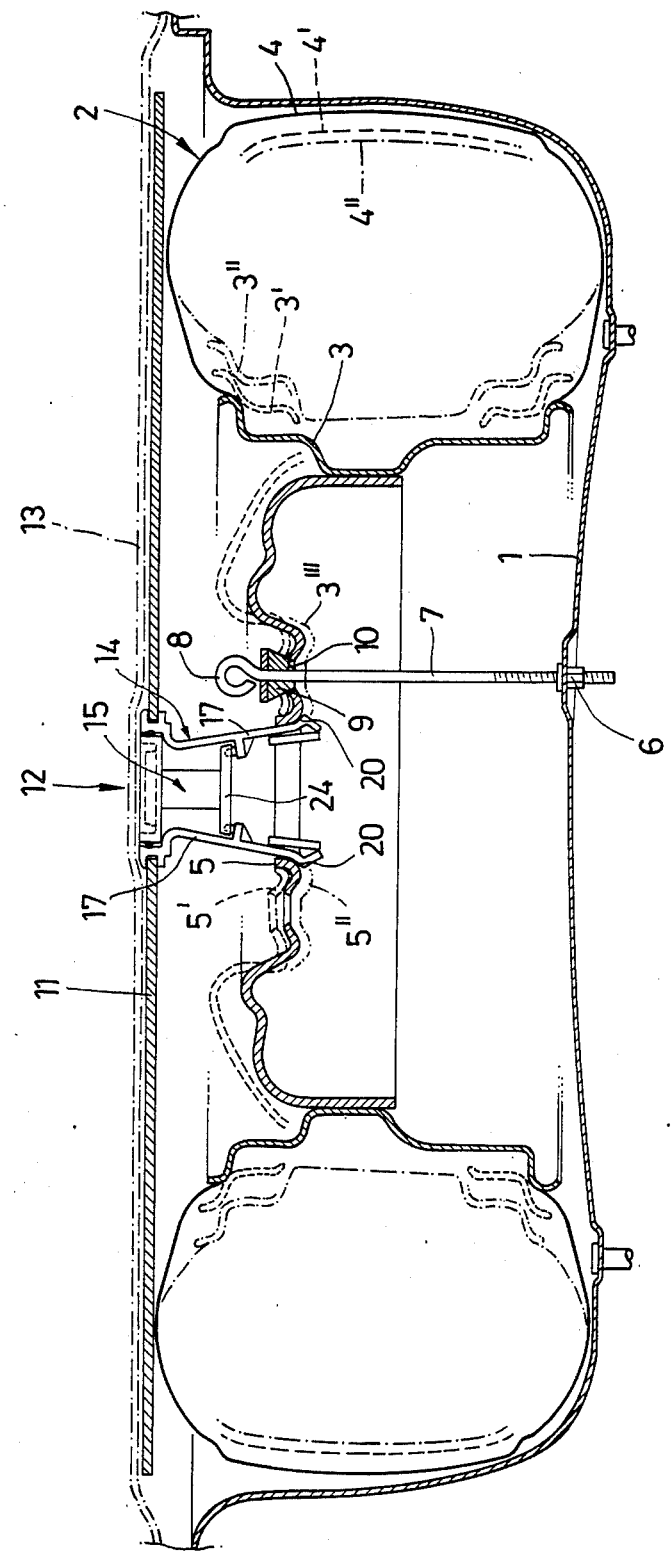
FIG. 1 is a vertical section through a motor vehicle body in the region of the spare wheel cavity with the spare wheel cover according to the present invention. One spare wheel size is indicated in solid lines; another possible size is indicated in broken or dash-dot lines.
Figure 2:
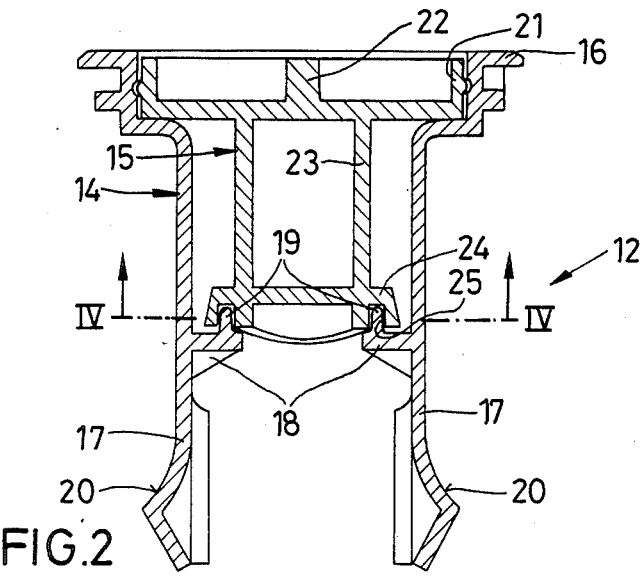
FIG. 2 is a vertical section through the fastening device of the present invention partially cut away.

FIG. 1 shows a vertical section through a motor vehicle body in the region of the spare wheel well in which spare wheel cavity 1 is formed as a bowl-shaped depression in the floor pan of the motor vehicle body. Spare wheel 2 is indicated in solid lines, it being possible for the spare wheel to vary both in its diameter and in its width depending upon the rim size 3 or 3' and 3" provided and the set of tires 4 or 4' and 4" fitted. The level of the hub bore 5, 5' or 5", and its diameter, can vary as a result of variations in tire size, rim size, and other factors such as the type of rim, and tire inflation.

Spare wheel 2 is clamped and secured within the bowl-shaped spare wheel cavity by means of a threaded nut 6 which is inserted into spare cavity 1 and by a threaded rod 7 with an upper handle 8 and a tapered member 9 which engages wheel nut bore 10. As may be seen from the partial view indicated by fine dash-dot lines at 3''', account must also be taken of the fact that the rim of a spare wheel without pressure lies substantially deeper than a spare wheel with a normal operating pressure. The present invention is compatible for use with a spare wheel under any of these conditions.

Spare wheel 2 is covered by spare wheel cover 11 which is secured by fastening device 12 in the center hub bore of spare wheel 2. Loose carpet overlay 13 is placed above cover plate 11.

Fastening device 12, illustrated in FIGS. 2-5, comprises holding part 14, inserted into circular cover plate 11, and a manually rotatable spreading cam assembly 15 operably associated with said holding part. Holding part 14 comprises upper bearing flange 16 from which two spreading arms 17 extend downwards into center hub bore 5. Spreading arms 17 comprise inwardly projecting brackets 18 with upwardly projecting guide pins 19 and are provided at their lower outer ends with projecting, curved, concave clamping surfaces 20.

Figure 4:
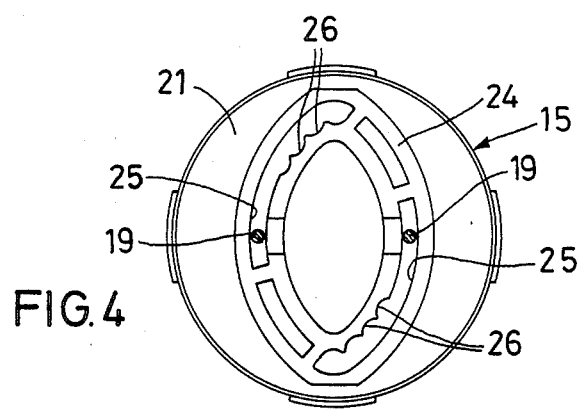
FIG. 4 is a view of the manually rotatable cam viewed from the plane of line IV—IV in FIG 2.

Manually rotatable spreading cam assembly 15 is provided at its upper end with a manually grippable handle 22 which is mounted upon disc flange 21. The disc flange is rotatably mounted to bearing flange 16. Web 23 extnds from disc flange 21 and carries spreading cam 24 which is provided with guide slots 25 which engage with guide pins 19 on the spreading arms. As shown in FIG. 4, guide slots 25 are provided on one side wall with a plurality of engaging recesses 26 which render it possible to secure the guide pins in specific positions so as to bias the spreading arms into firm contact with the center hub bore. This allows the device of the present invention to be used with spare wheels having hub bores of different diameters and depths. Accordingly, the oval shaped spreading cam allows the spreading arms 17 to be biased varying amounts from their at-rest position so as to accommodate wheel hub bores of differing diameters and this accommodation is further enhanced by the concave clamping surfaces 20 which promote secure clamping of spreading arms to the hub bore.

Figure 3:
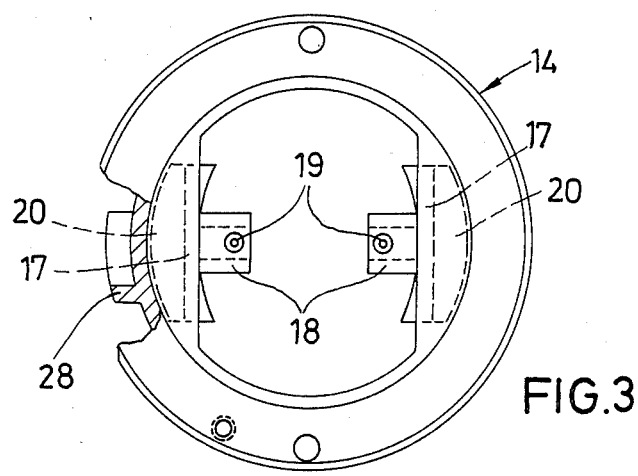
FIG. 3 is a plan view of the fastening device of the present invention with the manually rotatable cam removed.
Figure 5:
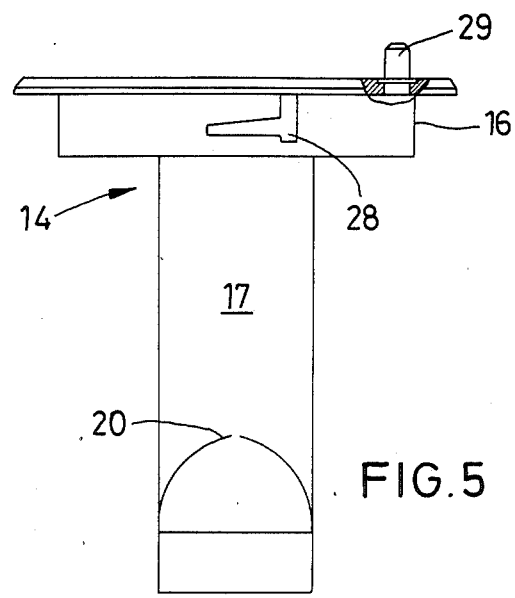
FIG. 5 is a side view of the fastening device of the present invention.
Figure 6:
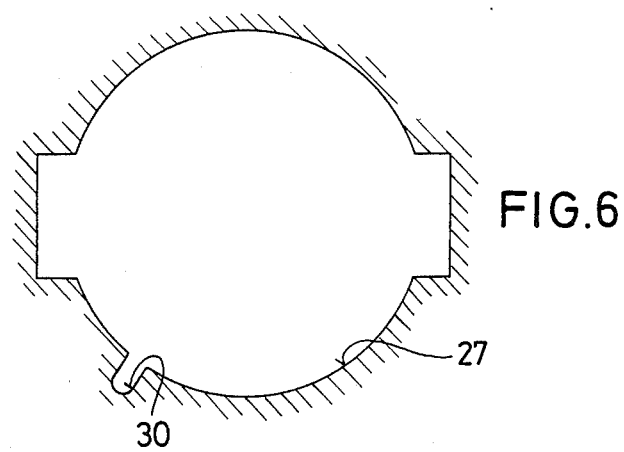
FIG. 6 shows the hole pattern of the receiving opening for the fastening device of the present invention in the spare wheel cover.

Fastening device 12 is inserted into the spare wheel cover 11 as shown in FIG. 6, by way of a keyhole-shaped central aperture 27 with which is associated corresponding projections 28 on bearing flange 16. Projections 28 are shown in FIGS. 3 and 5. A securing pin 29 is integrally moulded on bearing flange 16 and after bearing flange 16 is turned through A predetermined angle, during which projections 28 engage behind cover plate 11, securing pin 29 fixes the position of holding part 14 by pressing into opening 30 provided in cover plate 11.

The fastening device of the present invention is preferably constructed of a resilient plastic material such as nylon, polyvinyl chloride, or other plastics such as certain polyester compositions. Alternatively, ferrous or non-ferrous metals could be used for some of the components of the fastening device as could fiber reinforced plastic compositions.

The foregoing description presents the presently preferred embodiment of this invention. Alterations and modifications may occur to those skilled in the art which will come within the spirit and scope of the following claims.

I claim:

1. A cover for a motor vehicle spare wheel with a center hub bore comprising:
   a circular cover plate with a central aperture; and
   a fastening device, inserted through said central aperture, for securing said cover plate to said wheel comprising:
   a bearing flange in contact with said cover plate;
   a plurality of spreading arms extending from said bearing flange into said center hub bore with each of said arms having a guide pin projecting from an inwardly extending bracket; and
   a manually rotatable spreading cam assembly for biasing said spreading arms outwardly into contact with said center hub wherein said cam is rotated, said cam assembly being provided with guide slots for engaging said guide pins.

2. The cover according to claim 1 wherein each of said guide slots has a side wall including a plurality of recesses for engaging one of said guide pins.

3. The cover according to claim 1 wherein that portion of each of said spreading arms which contacts said center hub bore is provided with a projecting, curved, concave clamping surface.

4. The cover according to claim 1 wherein said manually rotatable cam assembly comprises:
   a manually grippable handle integral with a disc flange with said flange rotatably mounted to said bearing flange;
   an oval shaped spreading cam; and
   a web connecting said disc flange to said spreading cam.

5. A cover according to claim 1 wherein said spreading arms comprise a resilient plastic material.

* * * * *